(12) United States Patent
Huang

(10) Patent No.: US 11,166,330 B2
(45) Date of Patent: Nov. 2, 2021

(54) DATA-STREAM ALLOCATION METHOD FOR LINK AGGREGATION AND RELATED DEVICES

(71) Applicant: Guangdong Oppo Mobile Telecommunications Corp., Ltd., Guangdong (CN)

(72) Inventor: Yuan Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 210 days.

(21) Appl. No.: 16/524,921

(22) Filed: Jul. 29, 2019

(65) Prior Publication Data
US 2020/0068635 A1    Feb. 27, 2020

(30) Foreign Application Priority Data

Aug. 23, 2018  (CN) .......................... 201810968291.1

(51) Int. Cl.
*H04W 76/15*  (2018.01)
*H04L 5/00*  (2006.01)
(Continued)

(52) U.S. Cl.
CPC ............ *H04W 76/15* (2018.02); *H04L 5/006* (2013.01); *H04L 5/0046* (2013.01);
(Continued)

(58) Field of Classification Search
None
See application file for complete search history.

(56) References Cited

U.S. PATENT DOCUMENTS

| 2002/0118663 | A1 | 8/2002 | Dorenbosch et al. |
| 2015/0296380 | A1* | 10/2015 | Twist ............ H04W 4/60 455/411 |

(Continued)

FOREIGN PATENT DOCUMENTS

| CN | 102918925 B | 1/2016 |
| CN | 105578528 A | 5/2016 |

(Continued)

OTHER PUBLICATIONS

English translation of first office action issued in corresponding CN application No. 201810968291.1 dated Mar. 20, 2020.

(Continued)

*Primary Examiner* — Alex Skripnikov
(74) *Attorney, Agent, or Firm* — Young Basile Hanlon & MacFarlane, P.C.

(57) ABSTRACT

Provided are a data-stream allocation method for link aggregation and related devices. The method includes the following. A first peak transmission rate at a current time point for each of at least two wireless network modules is obtained, where the at least two wireless network modules are in link aggregation status. A data-stream allocation weight for each of the at least two wireless network modules is determined according to the first peak transmission rate of each of the at least two wireless network modules. Perform data-stream allocation for the at least two wireless network modules according to the data-stream allocation weight of each of the at least two wireless network modules.

18 Claims, 4 Drawing Sheets

(51) Int. Cl.
*H04L 12/26* (2006.01)
*H04W 48/18* (2009.01)

(52) U.S. Cl.
CPC ...... *H04L 43/0864* (2013.01); *H04L 43/0894* (2013.01); *H04W 48/18* (2013.01)

(56) References Cited

U.S. PATENT DOCUMENTS

2015/0382279 A1* 12/2015 Zhao .................. H04L 1/0003
370/225
2016/0119939 A1    4/2016 Himayat et al.

FOREIGN PATENT DOCUMENTS

| | | | |
|---|---|---|---|
| CN | 105656798 | A | 6/2016 |
| CN | 105682146 | A | 6/2016 |
| CN | 105898800 | A | 8/2016 |
| CN | 106850455 | A | 6/2017 |
| CN | 109587053 | A | 4/2019 |
| KR | 20170133165 | A | 12/2017 |
| WO | 2012155770 | A1 | 11/2012 |
| WO | 2018000644 | A1 | 1/2018 |

OTHER PUBLICATIONS

English translation of second office action issued in corresponding CN application No. 201810968291.1 dated May 25, 2020.
First Examination Report issued in corresponding IN application No. 201914030589 dated Jan. 19, 2021.
International search report issued in corresponding international application No. PCT/CN2019/097347 dated Oct. 24, 2019.
Extended European search report issued in corresponding European application No. 19190238.6 dated Dec. 12, 2019.

* cited by examiner

DATA-STREAM ALLOCATION METHOD FOR LINK AGGREGATION AND RELATED DEVICES

CROSS-REFERENCE TO RELATED APPLICATION(S)

This application claims priority to Chinese Patent Application Serial No. 201810968291.1, filed on Aug. 23, 2018, the entire disclosure of which is hereby incorporated by reference.

TECHNICAL FIELD

This disclosure relates to the field of electronic technology, and more particularly to a data-stream allocation method for link aggregation and related devices.

BACKGROUND

With link aggregation, electronic devices (such as smartphones) can simultaneously run two or more wireless network modules (such as a wireless Fidelity (Wi-Fi®) module and a data network module, etc.)) to transmit data. The link aggregation is an important technology for increasing a link bandwidth and achieving link transmission flexibility and redundancy. Under the link aggregation status, how to perform data-stream allocation for different wireless network modules is a technical problem needed to be solved.

SUMMARY

In implementations of the disclosure, a data-stream allocation method for link aggregation and related devices are provided.

According to a first aspect of the disclosure, a data-stream allocation method for link aggregation is provided. A first peak transmission rate at a current time point for each of at least two wireless network modules of an electronic device is obtained, where the at least two wireless network modules are in link aggregation status. A data-stream allocation weight for each of the at least two wireless network modules is determined according to the first peak transmission rate of each of the at least two wireless network modules. Perform data-stream allocation for the at least two wireless network modules according to the data-stream allocation weight for each of the at least two wireless network modules.

According to a second aspect of the disclosure, an electronic device is provided. The electronic device includes a processor and a memory. The memory is configured to store one or more programs. The one or more programs, when executed, are operable with the processor to: obtain a first peak transmission rate at a current time point for each of at least two wireless network modules of an electronic device, where the at least two wireless network modules are in link aggregation status; determine a data-stream allocation weight for each of the at least two wireless network modules according to the first peak transmission rate of each of the at least two wireless network modules; perform data-stream allocation for the at least two wireless network modules according to the data-stream allocation weight for each of the at least two wireless network modules.

According to a third aspect of the disclosure, a non-transitory computer readable storage medium is provided. The non-transitory computer readable storage medium is configured to store computer programs for electronic data interchange. The computer programs, when executed, are operable with a computer to: obtain a first peak transmission rate at a current time point for each of at least two wireless network modules of an electronic device, where the at least two wireless network modules are in link aggregation status; determine a data-stream allocation weight for each of the at least two wireless network modules according to the first peak transmission rate of each of the at least two wireless network modules; perform data-stream allocation for the at least two wireless network modules according to the data-stream allocation weight for each of the at least two wireless network modules and the number of data streams established at the current time point by the electronic device.

BRIEF DESCRIPTION OF THE DRAWINGS

To describe the technical solutions of the implementations of the disclosure or the related art more clearly, the following will give a brief description of accompanying drawings used for describing the implementations of the disclosure or the related art. Apparently, the accompanying drawings described in the following are merely some implementations of the disclosure. Those of ordinary skill in the art can also obtain other accompanying drawings based on the accompanying drawings described below without creative efforts.

DETAILED DESCRIPTION

In order to enable those skilled in the art to better understand solutions of the present disclosure, technical solutions embodied in implementations of the disclosure will be described in a clear and comprehensive manner in conjunction with the accompanying drawings. It is evident that the implementations described herein are merely some rather than all of the implementations of the disclosure. All other implementations obtained by those of ordinary skill in the art based on the implementations of the disclosure without creative efforts shall fall within the protection scope of the disclosure.

The following will describe the technical solutions of the disclosure in detail.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementations may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like.

Figure 1:
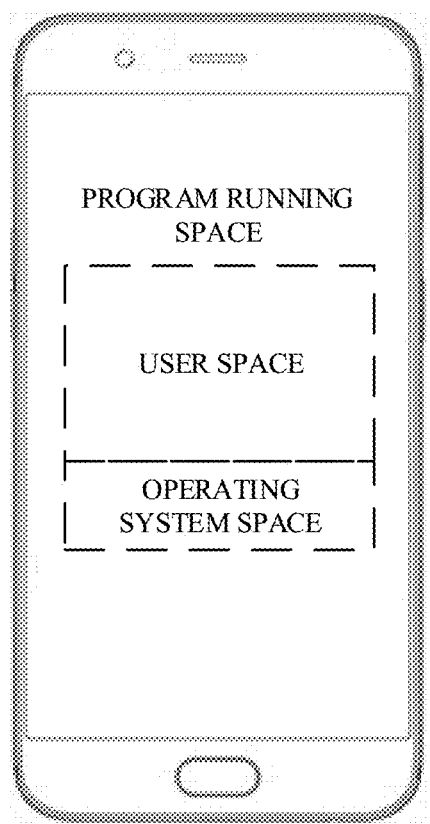
FIG. 1 is a schematic diagram illustrating a program running space of a smart phone according to an implementation of the disclosure.

As illustrated in FIG. 1, an electronic device such as a smart phone generally has a program running space. The program running space includes a user space and an operating system space (that is, a place to install the operating system). At least one application, which is a third-party application installed on the electronic device, can run in the user space. According to the implementations of the disclosure, software algorithm of the data-stream allocation method for link aggregation can run in the user space. An operating system of the electronic device runs in the operating system space.

Figure 2:
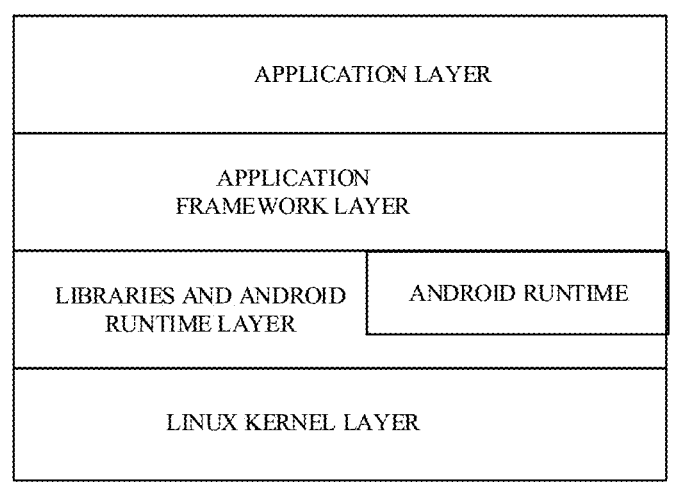
FIG. 2 is a schematic diagram illustrating a system architecture of an Android system according to an implementation of the disclosure.

Examples of the operating system include but are not limited to an Android® system and an iPhone operating system (iOS®) that is a mobile operating system developed by Apple®. As illustrated in FIG. 2, the following describes the Android system runs on the electronic device as an example. In the case of Android system, the user space includes an application layer of the Android system. The operating system space may include an application framework layer, Libraries and Android RunTime layer, and a Linux kernel layer of the Android system. The application layer includes various applications directly interacting with a user or service programs written in the Java language and running in the background, for example, programs for implementing common basic functions on smart phones, such as short messaging service (SMS), telephone dialing, picture viewers, calendars, games, maps, world wide web (Web) browsers and so on, as well as other applications developed by developers. The application framework layer provides a series of libraries necessary for developing Android applications, which can be used to reuse components and achieve personalize extensions through inheritance. The Libraries and Android RunTime layer can support the application framework and provide services for various components in the Android system. The Libraries and Android RunTime layer includes Libraries and Android RunTime. The Android RunTime includes a core library and a Dalvik virtual machine. The Linux kernel layer is configured to implement core functions such as hardware device driving, process and memory management, network protocol stacks, power management, and wireless communications.

A data-stream allocation method for link aggregation is provided. In this method, a first peak transmission rate at a current time point for each of at least two wireless network modules of an electronic device is obtained, where the at least two wireless network modules are in link aggregation status. A data-stream allocation weight for each of the at least two wireless network modules is determined according to the first peak transmission rate of each of the at least two wireless network modules. Data-stream allocation for the at least two wireless network modules is performed according to the data-stream allocation weight for each of the at least two wireless network modules.

The following describes the implementations of the disclosure in detail.

Figure 3:
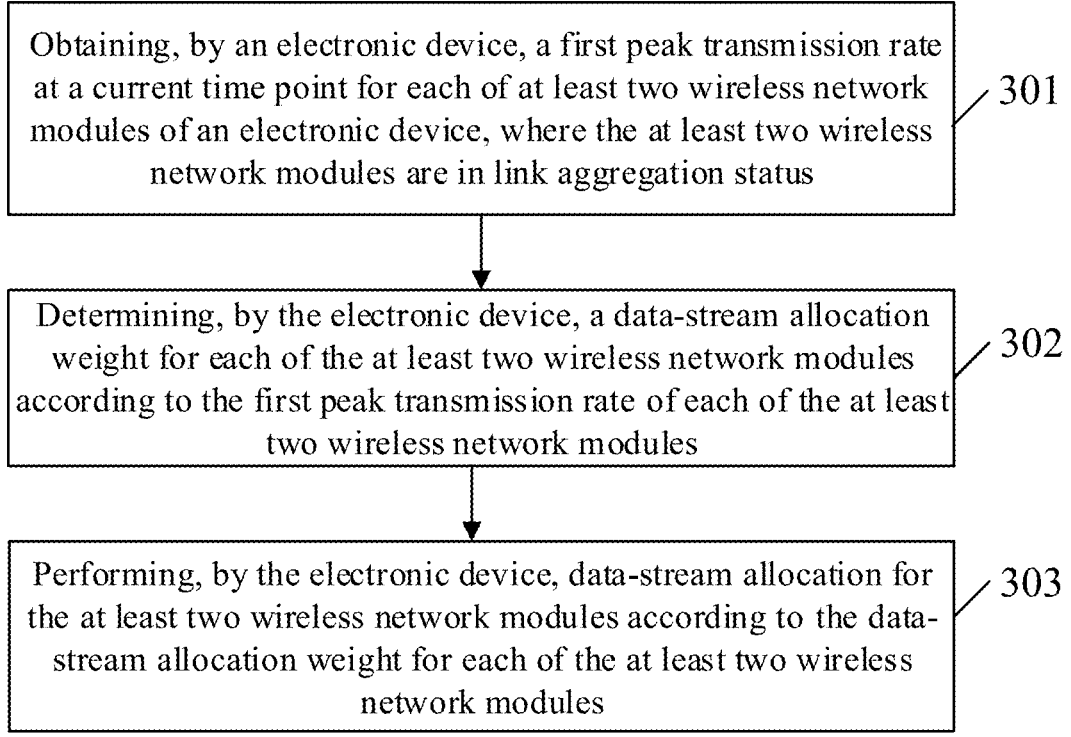
FIG. 3 is a schematic flow chart illustrating a data-stream allocation method for link aggregation according to an implementation of the disclosure.

FIG. 3 is a schematic flow chart illustrating a data-stream allocation method for link aggregation according to an implementation of the disclosure. The method begins at block 301.

At block 301, the electronic device obtains a first peak transmission rate at a current time point for each of at least two wireless network modules of an electronic device, where the at least two wireless network modules are in link aggregation status.

In one example, at least two first peak transmission rates obtained are in a one-to-one correspondence with the at least two wireless network modules.

The wireless network module may include a Wi-Fi module, a Bluetooth module, a data network module, a neighbor awareness network (NAN) module, and the like. The data network module can support 2-Generation wireless telephone technology (2G) network, 3rd-Generation wireless telephone technology (3G) network, and long term evolution (LTE) network, 5th-Generation wireless telephone technology (5G) network, etc.

At block 302, the electronic device determines a data-stream allocation weight for each of the at least two wireless network modules according to the first peak transmission rate of each of the at least two wireless network modules.

In one example, the data-stream allocation weight is used for indicating importance when performing data-stream allocation.

In one example, at least two data-stream allocation weights determined and the at least two wireless network modules are in one-to-one correspondence. A sum of the at least two data-stream allocation weights is equal to one.

At block 303, the electronic device performs data-stream allocation for the at least two wireless network modules according to the data-stream allocation weight for each of the at least two wireless network modules.

In one example, the operation at block 303 can be implemented as follows. The electronic device performs the data-stream allocation for the at least two wireless network modules according to the number of data streams established at the current time point by the electronic device and the at least two data-stream allocation weights determined.

For example, assuming that a Wi-Fi module and a data network module are in the link aggregation status, at block 303 it is determined that a data-stream allocation weight for the Wi-Fi module is ⅓ and a data-stream allocation weight for the data network module is ⅔, and three data streams are established at the current time point by the electronic device, the electronic device allocates one data stream to the Wi-Fi module and two data streams to the data network module. For another example, assuming that the Wi-Fi module and the data network module are in the link aggregation status, at block 303 it is determined that a data-stream allocation weight for the Wi-Fi module is ⅓ and a data-stream allocation weight for the data network module is ⅔, and four data streams are established at the current time point by the electronic device, the electronic device allocates one data stream to the Wi-Fi module and three data streams to the data network module.

The data stream is a set of data packets having a same data type. For example, video data packets belong to one data stream and picture data packets belong to another data stream, and so on.

It can be seen that, in the implementations of the disclosure, the electronic device obtains the first peak transmission rate at the current time point for each of the at least two wireless network modules of the electronic device, where the at least two wireless network modules are in the link aggregation status. The electronic device determines the data-stream allocation weight for each of the at least two wireless network modules according to the first peak transmission rate of each of the at least two wireless network modules. The electronic device performs the data-stream allocation for the at least two wireless network modules according to the data-stream allocation weight for each of the at least two wireless network modules. In the above manner, reasonable data-stream allocation for different wireless network modules in the link aggregation status can be realized, thereby improving stability of data transmission.

In one implementation of the disclosure, before obtaining the first peak transmission rate at the current time point for each of the at least two wireless network modules, the method further includes the following. The electronic device determines a data increment rate at the current time point for each of the at least two wireless network modules, obtains a second peak transmission rate determined last time for each of the at least two wireless network modules, and determines a first round-trip time (RTT) at the current time point for each of the at least two wireless network modules. Thereafter, the electronic device determines the first peak transmission rate at the current time point for each of the at least two wireless network modules according to the data increment rate of each of the at least two wireless network modules, the second peak transmission rate of each of the at least two wireless network modules, and the first RTT of each of the at least two wireless network modules.

In the implementation of the disclosure, at least two second peak transmission rates and the at least two wireless network modules are in one-to-one correspondence. At least two first RTTs and the at least two wireless network modules are in one-to-one correspondence. At least two data increment rates and the at least two wireless network modules are in one-to-one correspondence.

In computer network, RTT is an important performance index. RTT referred to herein represents a total delay from beginning of data transmission at a transmitter to receipt of a confirmation instruction at the transmitter, where the confirmation instruction is sent by a receiver immediately after receipt of the data.

In one implementation of the disclosure, the electronic device determines the data increment rate at the current time point for each of the at least two wireless network modules as follows. The electronic device obtains a first data amount at a first time point for each of the at least two wireless network modules, where the first time point is the current time point. The electronic device obtains a second data amount at a second time point for each of the at least two wireless network modules, where the second time point is earlier than the first time point. Thereafter, the electronic device determines the data increment rate at the current time point for each of the at least two wireless network modules according to the first data amount of each of the at least two wireless network modules and the second data amount of each of the at least two wireless network modules.

In one example, a difference between the first time point and the second time point is set in advance. The difference may be set by the electronic device by default. Alternatively, the difference may be set by a user, which is not limited herein.

In the implementation of the disclosure, at least two first data amounts and the at least two wireless network modules are in one-to-one correspondence. At least two second data amounts and the at least two wireless network modules are in one-to-one correspondence.

In addition, the electronic device determines the data increment rate at the current time point for each of the at least two wireless network modules according to the first data amount of each of the at least two wireless network modules and the second data amount of each of the at least two wireless network modules as follows. The electronic device determines the data increment rate at the current time point for each of the at least two wireless network modules according to the first data amount of each of the at least two wireless network modules, the second data amount of each of the at least two wireless network modules, and a first calculation formula.

The first calculation formula is that: data increment rate is equal to (first data amount minus second data amount) divided by (first time point minus second time point).

In one implementation of the disclosure, the electronic device determines the first RTT at the current time point for each of the at least two wireless network modules as follows. The electronic device determines a second RTT for running a transmission control protocol (TCP). The electronic device obtains a third RTT determined last time for each of the at least two wireless network modules. Thereafter, the electronic device determines the first RTT at the current time point for each of the at least two wireless network modules according to the second RTT and the third RTT of each of the at least two wireless network modules.

At least two third RTTs and the at least two wireless network modules are in one-to-one correspondence.

The second RTT refers to transmission duration from beginning of transmission of a TCP packet at a transmitter to receipt of an immediate response for the TCP packet at the transmitter.

In one example, the electronic device determines the second RTT for running the TCP as follows. The electronic device determines the second RTT for running the TCP via a tcp_rtt_estimator ( ) function. The second RTT is a RTT of the first request after three handshakes, such as a RRT of a HTTP get or a RRT of a HTTP post. The three handshakes refer to three processes for confirming TCP connection.

Moreover, the electronic device determines the first RTT at the current time point for each of the at least two wireless network modules according to the second RTT and the third RTT of each of the at least two wireless network modules as follows. The electronic device determines the first RTT at the current time point for each of the at least two wireless network modules according to the second RTT, the third RTT of each of the at least two wireless network modules, and a second calculation formula.

In particular, the second calculation formula is that: first RTT is equal to (third RTT plus second RTT) divided by 2.

In one implementation of the disclosure, according to the data increment rate of each of the at least two wireless network modules, the second peak transmission rate of each of the at least two wireless network modules, and the first RTT of each of the at least two wireless network modules, the electronic device determines the first peak transmission rate at the current time point for each of the at least two wireless network modules as follows. The electronic device determines the first peak transmission rate at the current time point for each of the at least two wireless network modules according to the data increment rate of each of the at least two wireless network modules, the second peak transmission rate of each of the at least two wireless network modules, the first RTT of each of the at least two wireless network modules, and a first rule. The first rule is determining, based on that the first RTT of each of the at least two wireless network modules is shorter than a predetermined RTT, a larger one in the data increment rate of each of the at least two wireless network modules and the second peak transmission rate of each of the at least two wireless network modules as the first peak transmission rate of each of the at least two wireless network modules, and determining, based on that the first RTT of each of the at least two wireless network modules is longer than or equal to the predetermined RTT, n times a larger one in the data increment rate of each of the at least two wireless network modules and the second peak transmission rate of each of the at least two wireless network modules as the first peak transmission rate of each of the at least two wireless network modules, where n is a positive number smaller than 1.

In one implementation of the disclosure, the electronic device determines the data-stream allocation weight for each of the at least two wireless network modules according to the first peak transmission rate of each of the at least two wireless network modules as follows. The electronic device determines the data-stream allocation weight for each of the at least two wireless network modules according to the first peak transmission rate of each of the at least two wireless network modules and a second rule. The second rule is that the data-stream allocation weight for each of the at least two wireless network modules is equal to the first peak transmission rate of each of the at least two wireless network modules divided by a sum of the first peak transmission rates of the at least two wireless network modules.

The sum of the data-stream allocation weights each for one of the at least two wireless network modules is equal to one.

In one implementation of the disclosure, after the electronic device performs the data-stream allocation for the at least two wireless network modules according to the data-stream allocation weight for each of the at least two wireless network modules, the following can be conducted. The electronic device obtains a third peak transmission rate at the current time point for each of the at least two wireless network modules. The electronic device performs another data-stream allocation based on that a difference between the third peak transmission rate of one of the at least two wireless network modules and the first peak transmission rate of the one of the at least two wireless network modules is higher than or equal to a predetermined value.

It should be noted that operations of determining the third peak transmission rate correspond to the operations of determining the first peak transmission rate, and details are not described herein. The electronic device performing the another data-stream allocation refers to that the electronic device performs the operations at block 301 to block 303. During performing the another data-stream allocation, in the implementation of the disclosure, the operation at block 301 is performed once again to obtain the first peak transmission rate, and the first transmission peak rate is determined as the third peak transmission rate.

As can be seen, in the implementation of the disclosure, the data-stream allocation can be performed when a change of a transmission rate of a wireless network module is relatively large. In this manner, it is possible to adopt a new data-stream allocation strategy in time, thereby further improving stability of data transmission.

In one example, after the electronic device performs the data-stream allocation for the at least two wireless network modules according to the data-stream allocation weight for each of the at least two wireless network modules, the following can be conducted. The electronic device performs another data-stream allocation based on that a first set application is switched to be a foreground application of the electronic device.

The first set application may be set by the user. Alternatively, the first set application may be set by the electronic device by default, which is not limited herein. For example, the first set application may be a shopping application, an audio playing application, a video playing application, an instant messenger application, a camera application and the like.

In another example, before performing the operation at block 301, the following can be conducted. The electronic device enables a link aggregation function based on a predetermined condition. The predetermined condition includes at least one of the following: a second set application being running in the foreground of the electronic device, a Wi-Fi network being used at the current time point by the electronic device and a parameter indicating quality of the Wi-Fi network being lower than a first threshold value, a set touch operation performed on a display screen of the electronic device being detected by the electronic device, a set gesture being detected by the electronic device, and a set tap signal being detected by the electronic device.

The second set application may be set by the user. Alternatively, the first set application may be set by the electronic device by default, which is not limited herein. For example, the second set application may be a shopping application, an audio playing application, a video playing application, an instant messenger application, a camera application, and the like.

The set touch operation may be set by the user. Alternatively, the set touch operation may be set by a NAN device, which is not limited herein. For example, the set touch operation may be a click operation, a multi-click operation, a sliding operation (such as a left-sliding operation, a right-sliding operation, an up-sliding operation, and a down-sliding operation, etc.), an operation that a sliding operation is performed after a click operation, an operation that a sliding operation is performed after a multi-click operation, an operation that a click operation is performed after a sliding operation, an operation that a multi-click operation is performed after a sliding operation, and so on. The set gesture may be set by the user. Alternatively, the set gesture may be set by the NAN device, which is not limited herein. For example, the set gesture may be a gesture of snapping fingers, an OK gesture, a gesture that the gesture of snapping fingers is performed after the OK gesture, a gesture that the OK gesture is performed after the gesture of snapping fingers, and so on.

The set tap signal may be set by the user. Alternatively, the set tap signal may be set by the NAN device, which is not limited herein. The tap signal may include at least one of the following: the number of times of tap, a tap frequency, and a tap action. The tap action may include a single tap action, or may be embodied as multiple tap actions. When the tap action is embodied as multiple tap actions, two or more tap actions among the multiple tap actions are different from each other. The set tap signal may be input in advance according to a set tap action and the number of times of tap. The set tap action is a simple tap action, such as tapping with one finger. Alternatively, the set tap action is a complex tap action, such as an action that tapping lightly with a first finger is performed a few times and then tapping heavily with a second finger is performed a few times.

As such, according to the implementations of the application, the link aggregation function of the electronic device is performed under the predetermined condition, which can improve usage efficiency of the network.

Figure 4:
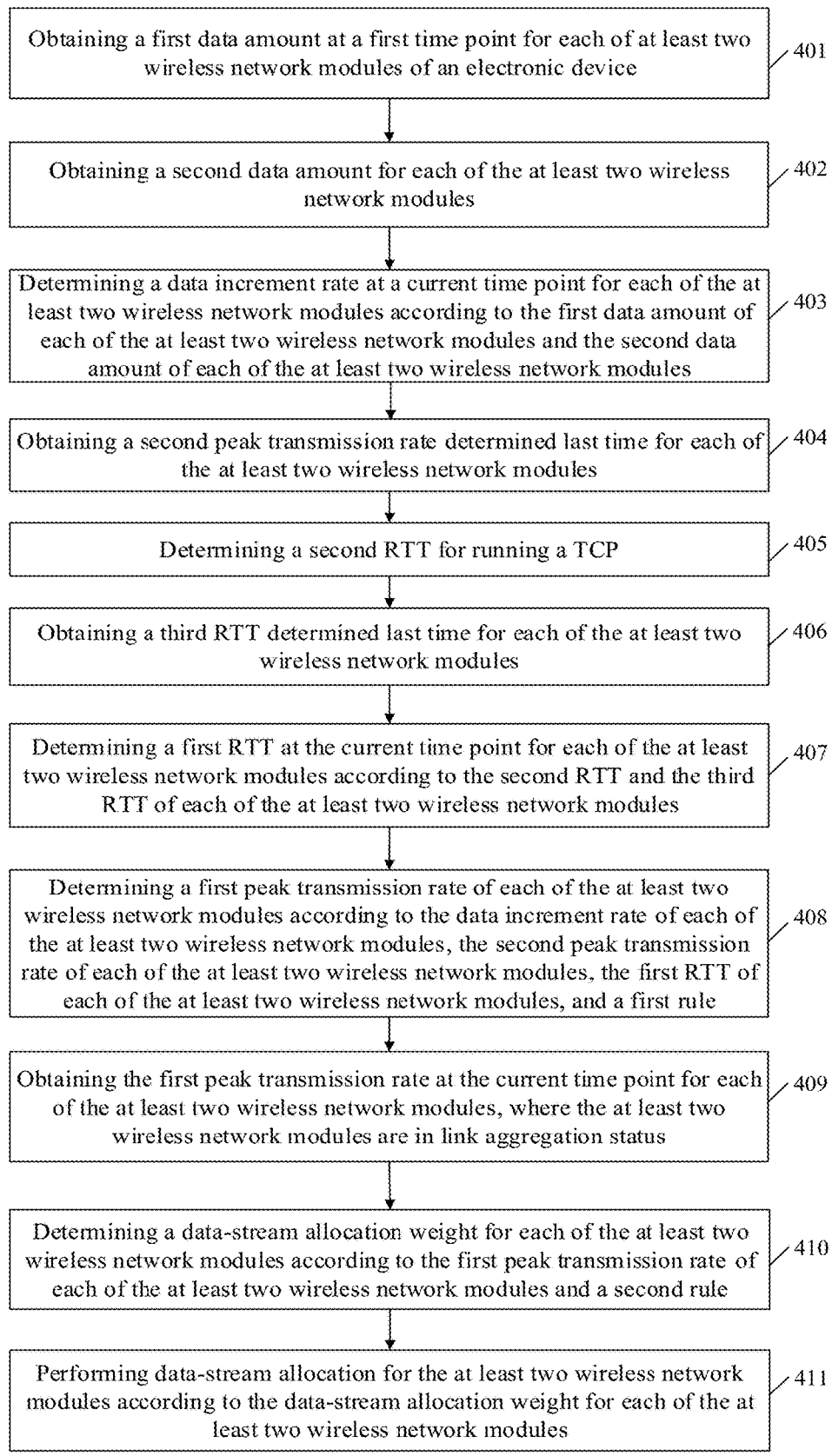
FIG. 4 is a schematic flow chart illustrating a data-stream allocation method for link aggregation according to another implementation of the disclosure.

Consistent with the implementations illustrated in FIG. 2, FIG. 3 is a schematic flow chart illustrating a data-stream allocation method for link aggregation according to another implementation of the disclosure. As illustrated in FIG. 4, the method begins at block 401.

At block 401, the electronic device obtains a first data amount at a first time point for each of at least two wireless network modules of an electronic device, where the first time point is a current time point.

At block 402, the electronic device obtains a second data amount at a second time point for each of the at least two wireless network modules, where the second time point is earlier than the first time point.

At block 403, the electronic device determines a data increment rate at the current time point for each of the at least two wireless network modules according to the first data amount of each of the at least two wireless network modules and the second data amount of each of the at least two wireless network modules.

At block 404, the electronic device obtains a second peak transmission rate determined last time for each of the at least two wireless network modules.

At block 405, the electronic device determines a second RTT for running a TCP.

At block 406, the electronic device obtains a third RTT determined last time for each of the at least two wireless network modules.

At block 407, the electronic device determines a first RTT at the current time point for each of the at least two wireless network modules according to the second RTT and the third RTT of each of the at least two wireless network modules.

At block 408, the electronic device determines a first peak transmission rate of each of the at least two wireless network modules according to the data increment rate of each of the at least two wireless network modules, the second peak transmission rate of each of the at least two wireless network modules, the first RTT of each of the at least two wireless network modules, and a first rule.

The first rule is: determining, based on that the first RTT of each of the at least two wireless network modules is shorter than a predetermined RTT, a larger one in the data increment rate of each of the at least two wireless network modules and the second peak transmission rate of each of the at least two wireless network modules as the first peak transmission rate of each of the at least two wireless network modules, and determining, based on that the first RTT of each of the at least two wireless network modules is longer than or equal to the predetermined RTT, n times a larger one in the data increment rate of each of the at least two wireless network modules and the second peak transmission rate of each of the at least two wireless network modules as the first peak transmission rate of each of the at least two wireless network modules, where n is a positive number smaller than 1.

At block 409, the electronic device obtains the first peak transmission rate at the current time point for each of the at least two wireless network modules, where the at least two wireless network modules are in link aggregation status.

At block 410, the electronic device determines a data-stream allocation weight for each of the at least two wireless network modules according to the first peak transmission rate of each of the at least two wireless network modules and a second rule.

The second rule is that the data-stream allocation weight for each of the at least two wireless network modules is equal to the first peak transmission rate of each of the at least two wireless network modules divided by a sum of the first peak transmission rates of the at least two wireless network modules.

At block 411, the electronic device performs data-stream allocation for the at least two wireless network modules according to the data-stream allocation weight for each of the at least two wireless network modules.

For example, assuming that a Wi-Fi module and a data network module are in the link aggregation status, the first time point minus the second time point is 1 s, a first data amount of the Wi-Fi module is 20 byte, a first data amount of the data network module is 25 byte, a second data amount of the Wi-Fi module is 10 byte, and a second data amount of the data network module is 15 byte, a data increment rate at the current time point for the Wi-Fi module is 10 byte/s obtained by (20 byte-10 byte)/1 s, and a data increment rate at the current time point for the data network module is 10 byte/s obtained by (25 byte15 byte)/1 s. In addition, assuming that a second peak transmission rate determined last time for the Wi-Fi module is 15 byte/s, a second peak transmission rate determined last time for the data network module is 10 byte/s, a second RTT is 50 ms, a third RTT determined last time for the Wi-Fi module is 40 ms, a third RTT determined last time for the data network module is 50 ms, then a first RTT at the current time point for the Wi-Fi module is 45 ms obtained by (50 ms+40 ms)/2, and a first RTT at the current time point for the data network module is 50 ms obtained by (50 ms+50 ms)/2. Furthermore, assuming that a predetermined RTT is 50 ms, n=2, then a first peak transmission rate of the Wi-Fi module is 15 byte/s obtained by max(10 byte/s, 15 byte/s), a first peak transmission rate of the data network module is 5 byte/s obtained by max(10 byte/s, 10 byte/s)/2, a data-stream allocation weight for the Wi-Fi module is ¾ obtained by (15 byte/s)/(15 byte/s+5 byte/s), and a data-stream allocation weight for the data network module is ¼ obtained by (5 byte/s)/(15 byte/s+5 byte/s).

It should be noted that, the operations at block 401-block 408 are used to determine the peak transmission rate at the current time point for each of the at least two wireless network modules. The operations at block 401-block 408 are performed periodically, for example, the operations at block 401-block 408 are performed every 1 second, every 5 seconds, or every 10 seconds, which are not limited herein. The operations at block 401 to 408 are also performed when the at least two wireless network modules are not under the link aggregation status. The operations at block 409-block 411 may not be needed to be performed for each determination of the peak transmission rate at the current time point for each of the at least two wireless network modules, and are performed only when a certain condition is met (as described in the above method implementations). For technical details not described in detail in the example, reference may be made to related descriptions in the method implementations of the disclosure, which are not described herein.

Figure 5:
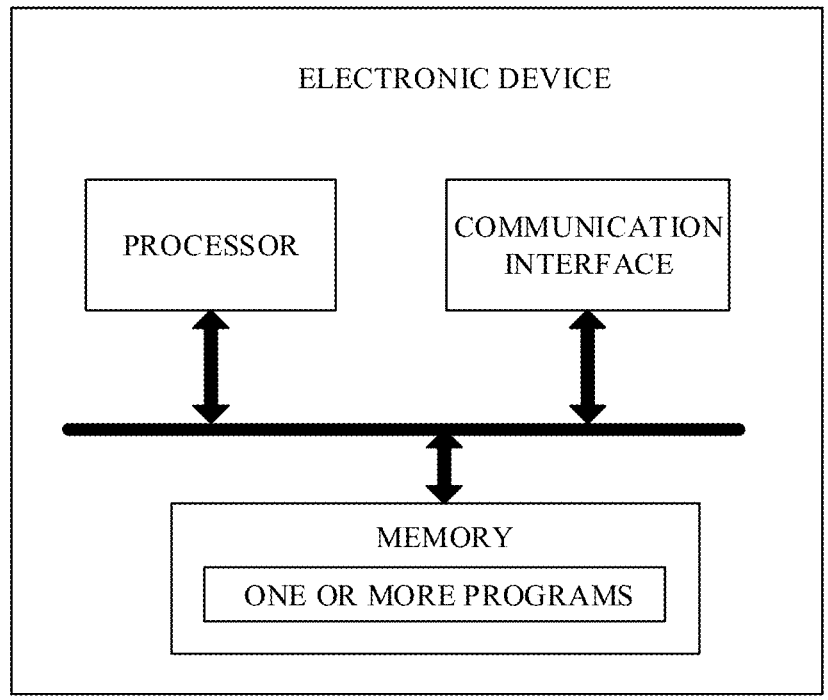
FIG. 5 is a schematic structural diagram illustrating an electronic device according to an implementation of the disclosure.

Consistent with the implementations illustrated in FIG. 3 and FIG. 4, FIG. 5 is a schematic structural diagram illustrating an electronic device according to an implementation of the disclosure. As illustrated in FIG. 5, the electronic device includes a processor, a memory, a communication interface, and one or more programs. The one or more programs are stored in the memory and configured to be performed by the processor. The one or more programs include instructions operable with the processor to: obtain a first peak transmission rate at a current time point for each of at least two wireless network modules of an electronic device, where the at least two wireless network modules are in the link aggregation status; determine a data-stream allocation weight for each of the at least two wireless network modules according to the first peak transmission rate of each of the at least two wireless network modules; perform data-stream allocation for the at least two wireless network modules according to the data-stream allocation weight for each of the at least two wireless network modules.

In one implementation of the disclosure, before obtaining the first peak transmission rate at the current time point for each of the at least two wireless network modules, the one or more programs further include instructions operable with the processor to: determine a data increment rate at the current time point for each of the at least two wireless network modules; obtain a second peak transmission rate determined last time for each of the at least two wireless network modules; determine a first RTT at the current time point for each of the at least two wireless network modules; determine the first peak transmission rate of each of the at least two wireless network modules according to the data increment rate of each of the at least two wireless network modules, the second peak transmission rate of each of the at least two wireless network modules, and the first RTT of each of the at least two wireless network modules.

In one implementation of the disclosure, in terms of determining the data increment rate at the current time point for each of the at least two wireless network modules, the one or more programs include instructions operable with the processor to: obtain a first data amount at a first time point for each of the at least two wireless network modules, where the first time point is the current time point; obtain a second data amount at a second time point for each of the at least two wireless network modules, where the second time point is earlier than the first time point; determine the data increment rate at the current time point for each of the at least two wireless network modules according to the first data amount of each of the at least two wireless network modules and the second data amount of each of the at least two wireless network modules.

In one implementation of the disclosure, in terms of determining the first RTT at the current time point for each of the at least two wireless network modules, the one or more programs include instructions operable with the processor to: determine a second RTT for running a TCP; obtain a third RTT determined last time for each of the at least two wireless network modules; determine the first RTT at the current time point for each of the at least two wireless network modules according to the second RTT and the third RTT of each of the at least two wireless network modules.

In one implementation of the disclosure, in terms of determining the first peak transmission rate at the current time point for each of the at least two wireless network modules according to the data increment rate of each of the at least two wireless network modules, the second peak transmission rate of each of the at least two wireless network modules, and the first RTT of each of the at least two wireless network modules, the one or more programs include instructions operable with the processor to: determine the first peak transmission rate at the current time point for each of the at least two wireless network modules according to the data increment rate of each of the at least two wireless network modules, the second peak transmission rate of each of the at least two wireless network modules, the first RTT of each of the at least two wireless network modules, and a first rule.

The first rule is determining, based on that the first RTT of each of the at least two wireless network modules is shorter than a predetermined RTT, a larger one in the data increment rate of each of the at least two wireless network modules and the second peak transmission rate of each of the at least two wireless network modules as the first peak transmission rate of each of the at least two wireless network modules, and determining, based on that the first RTT of each of the at least two wireless network modules is longer than or equal to the predetermined RTT, n times a larger one in the data increment rate of each of the at least two wireless network modules and the second peak transmission rate of each of the at least two wireless network modules as the first peak transmission rate of each of the at least two wireless network modules, where n is a positive number less than 1.

In one implementation of the disclosure, in terms of determining the data-stream allocation weight for each of the at least two wireless network modules according to the first peak transmission rate of each of the at least two wireless network modules, the one or more programs include instructions operable with the processor to: determine the data-stream allocation weight for each of the at least two wireless network modules according to the first peak transmission rate of each of the at least two wireless network modules and a second rule. The second rule is that the data-stream allocation weight for each of the at least two wireless network modules is equal to the first peak transmission rate of each of the at least two wireless network modules divided by a sum of the first peak transmission rate of the at least two wireless network modules.

In one implementation of the disclosure, after performing the data-stream allocation for the at least two wireless network modules according to the data-stream allocation weight of each of the at least two wireless network modules, the one or more programs further include instructions operable with the processor to: obtain a third peak transmission rate at the current time point for each of the at least two wireless network modules; perform another data-stream allocation based on that a difference between the third peak transmission rate of one of the at least two wireless network modules and the first peak transmission rate of the one of the at least two wireless network modules is higher than or equal to a predetermined value.

It should be noted that for technical details not described, reference may be made to the method implementations of the disclosure, which are not described herein.

The foregoing implementations mainly introduces the solution of the implementation of the disclosure from the perspective of performing the process on the method side. It can be understood that the electronic device includes corresponding hardware structures and/or software modules for performing the respective functions in order to implement the above functions. Those skilled in the art will readily appreciate that the disclosure can be implemented in hardware or a combination of hardware and computer software in combination with the elements and algorithm steps of the various examples described in the implementations disclosed herein. Whether a function is implemented in hardware or computer software to drive hardware depends on the specific application and design constraints of the solution. A person skilled in the art can use different methods for each particular application to implement the described functionality, but such implementation should not be considered to be beyond the scope of the application.

In the implementations of the disclosure, the electronic device may be divided into functional units according to the method implementations. For example, the functional units may be divided according to various functions, or two or more functions may be integrated into one processing unit. The integrated unit can be implemented in the form of hardware or in the form of a software functional unit. It should be noted that the unit division in the implementation of the disclosure is illustrative and only a logical function division, and there can be other manners of division during actual implementations.

Figure 6:
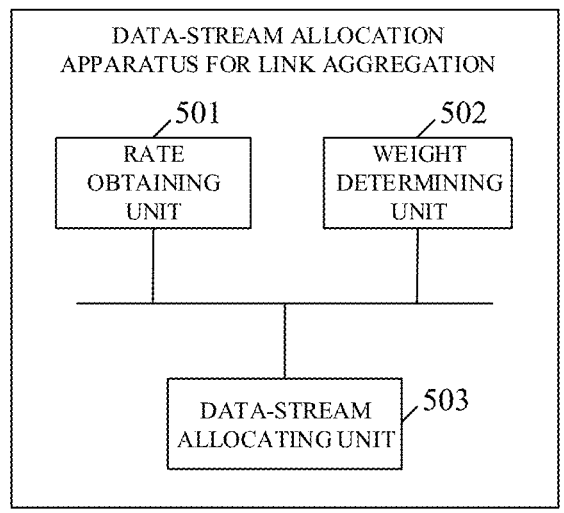
FIG. 6 is a schematic structural diagram illustrating a data-stream allocation apparatus for link aggregation according to an implementation of the disclosure.

The following will describes the apparatus implementation of the disclosure, The apparatus is used to perform the method of the method implementations. FIG. 6 is a schematic structural diagram illustrating a data-stream allocation apparatus for link aggregation according to an implementation of the disclosure The apparatus includes a rate obtaining unit 601, a weight determining unit 602, and a data-stream allocating unit 603.

The rate obtaining unit 601 is configured to obtain a first peak transmission rate at a current time point for each of at least two wireless network modules of an electronic device, where the at least two wireless network modules are in link aggregation status. The weight determining unit 602 is configured to determine a data-stream allocation weight for each of the at least two wireless network modules according to the first peak transmission rate of each of the at least two wireless network modules. The data-stream allocating unit 603 is configured to perform data-stream allocation for the at least two wireless network modules according to the data-stream allocation weight for each of the at least two wireless network modules.

In one example of the disclosure, before the rate obtaining unit 601 is configured to obtain the first peak transmission rate at the current time point for each of at least two wireless network modules, the apparatus further includes a first unit (not illustrated), a second unit (not illustrated), a third unit (not illustrated), and a fourth unit (not illustrated). The first unit is configured to determine a data increment rate at the current time point for each of the at least two wireless network modules. The second unit is configured to obtain a second peak transmission rate determined last time for each of the at least two wireless network modules. The third unit is configured to determine a first RTT at the current time point for each of the at least two wireless network modules. The fourth unit is configured to determine the first peak transmission rate of each of the at least two wireless network modules according to the data increment rate of each of the at least two wireless network modules, the second peak transmission rate of each of the at least two wireless network modules, and the first RTT of each of the at least two wireless network modules.

In one example of the disclosure, the first unit configured to determine the data increment rate at the current time point for each of the at least two wireless network modules is configured to: obtain a first data amount at a first time point for each of the at least two wireless network modules, where the first time point is the current time point; obtain a second data amount at a second time point for each of the at least two wireless network modules, where the second time point is earlier than the first time point; determine the data increment rate at the current time point for each of the at least two wireless network modules according to the first data amount of each of the at least two wireless network modules and the second data amount of each of the at least two wireless network modules.

In one example of the disclosure, the third unit configured to determine the first RTT at the current time point for each of the at least two wireless network modules is configured to: determine a second RTT for running a TCP; obtain a third RTT determined last time for each of the at least two wireless network modules; determine the first RTT at the current time point for each of the at least two wireless network modules according to the second RTT and the third RTT of each of the at least two wireless network modules.

In one example of the disclosure, the fourth unit configured to determine the first peak transmission rate of each of the at least two wireless network modules according to the data increment rate of each of the at least two wireless network modules, the second peak transmission rate of each of the at least two wireless network modules, and the first RTT of each of the at least two wireless network modules is configured to: determine the first peak transmission rate at the current time point for each of the at least two wireless network modules according to the data increment rate of each of the at least two wireless network modules, the second peak transmission rate of each of the at least two wireless network modules, the first RTT of each of the at least two wireless network modules, and a first rule. The first rule is determining, based on that the first RTT of each of the at least two wireless network modules is shorter than a predetermined RTT, a larger one in the data increment rate of each of the at least two wireless network modules and the second peak transmission rate of each of the at least two wireless network modules as the first peak transmission rate of each of the at least two wireless network modules, and determining, based on that the first RTT of each of the at least two wireless network modules is longer than or equal to the predetermined RTT, n times a larger one in the data increment rate of each of the at least two wireless network modules and the second peak transmission rate of each of the at least two wireless network modules as the first peak transmission rate of each of the at least two wireless network modules, where n is a positive number less than 1.

In one example of the disclosure, the weight determining unit 602 configured to determine the data-stream allocation weight for each of the at least two wireless network modules according to the first peak transmission rate of each of the at least two wireless network modules is configured to: determine the data-stream allocation weight for each of the at least two wireless network modules according to the first peak transmission rate of each of the at least two wireless network modules and a second rule. The second rule is that the data-stream allocation weight for each of the at least two wireless network modules is equal to the first peak transmission rate of each of the at least two wireless network modules divided by a sum of first peak transmission rates of the at least two wireless network modules.

In one example of the disclosure, after the data-stream allocating unit 603 is configured to perform the data-stream allocation for the at least two wireless network modules according to the data-stream allocation weight of each of the at least two wireless network modules, the apparatus further includes a fifth unit (not illustrated) and a sixth unit (not illustrated). The fifth unit is configured to obtain a third peak transmission rate at the current time point for each of the at least two wireless network modules. The sixth unit is configured to perform another data-stream allocation based on that a difference between the third peak transmission rate of one of the at least two wireless network modules and the first peak transmission rate of the one of the at least two wireless network modules is higher than or equal to a predetermined value.

In should be noted that the rate obtaining unit 601, the weight determining unit 602, the data-stream allocating unit 603, the first unit, the second unit, the third unit, the fourth unit, the fifth unit, and the sixth unit all may be implemented with a processing unit.

Implementations of the disclosure also provide a non-transitory computer readable storage medium. The non-transitory computer readable storage medium is configured to store computer programs. The computer programs, when executed, are operable with a computer to: obtain a first peak transmission rate at a current time point for each of at least two wireless network modules of an electronic device, where the at least two wireless network modules are in link aggregation status; determine a data-stream allocation weight for each of the at least two wireless network modules according to the first peak transmission rate of each of the at least two wireless network modules; perform data-stream allocation for the at least two wireless network modules according to the data-stream allocation weight for each of the at least two wireless network modules and the number of data streams established at the current time point by the electronic device. The computer includes an electronic device.

In one implementation of the disclosure, the data stream is a set of data packets having a same data type.

Herein, the computer programs, when executed, are operable with a computer to perform all or part of the operations of any of the methods described in the foregoing method implementations.

Implementations of the disclosure also provide a computer program product. The computer program product includes a non-transitory computer readable storage medium storing computer programs. The computer programs are operable with a computer to perform all or part of the operations of any of the methods described in the above method implementations. The computer program product may be a software installation package. The computer may be an electronic device.

It is to be noted that, for the sake of simplicity, the foregoing method implementations are described as a series of action combinations, however, it will be appreciated by those skilled in the art that the disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling, or direct coupling, or communication connection between each illustrated or discussed components may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the present disclosure in detail. The principle and implementations of the present disclosure are illustrated by specific examples. The illustration of the above implementations are merely used to facilitate understanding of the methods and core concept of the present disclosure. For a person skilled in the art, according to the concept of the present disclosure, specific implementations and application ranges may be both changed. Based on the above, the present disclosure shall not be understood to be limited to the specification.

What is claimed is:

1. A method of data-stream allocation for link aggregation, the method comprising:
    obtaining a first peak transmission rate at a current time point for each of at least two wireless network modules of an electronic device, the at least two wireless network modules being in link aggregation status;
    determining a data-stream allocation weight for each of the at least two wireless network modules according to the first peak transmission rate of each of the at least two wireless network modules;

performing data-stream allocation for the at least two wireless network modules according to the data-stream allocation weight for each of the at least two wireless network modules;
obtaining a second peak transmission rate at the current time point for each of the at least two wireless network modules; and
performing another data-stream allocation based on that a difference between the second peak transmission rate of one of the at least two wireless network modules and the first peak transmission rate of the one of the at least two wireless network modules is higher than or equal to a predetermined value.

2. The method of claim 1, further comprising:
enabling a link aggregation function based on a predetermined condition.

3. The method of claim 2, wherein the predetermined condition comprises at least one of: a target application being running in a foreground of the electronic device, a Wi-Fi network being used at the current time point by the electronic device and a parameter indicating quality of the Wi-Fi network being lower than a first threshold value, a target touch operation being performed on a display screen of the electronic device, a target gesture being detected by the electronic device, and a target tap signal being detected by the electronic device.

4. The method of claim 1, further comprising:
determining a data increment rate at the current time point for each of the at least two wireless network modules;
obtaining a second peak transmission rate determined last time for each of the at least two wireless network modules;
determining a first round-trip time (RTT) at the current time point for each of the at least two wireless network modules; and
determining the first peak transmission rate of each of the at least two wireless network modules according to the data increment rate of each of the at least two wireless network modules, the second peak transmission rate of each of the at least two wireless network modules, and the first RTT of each of the at least two wireless network modules.

5. The method of claim 4, wherein determining the data increment rate at the current time point for each of the at least two wireless network modules comprises:
obtaining a first data amount at a first time point for each of the at least two wireless network modules, the first time point being the current time point;
obtaining a second data amount at a second time point for each of the at least two wireless network modules, the second time point being earlier than the first time point; and
determining the data increment rate at the current time point for each of the at least two wireless network modules according to the first data amount of each of the at least two wireless network modules and the second data amount of each of the at least two wireless network modules.

6. The method of claim 4, wherein determining the first RTT at the current time point for each of the at least two wireless network modules comprises:
determining a second RTT for running a transmission control protocol (TCP);
obtaining a third RTT determined last time for each of the at least two wireless network modules; and
determining the first RTT at the current time point for each of the at least two wireless network modules according to the second RTT and the third RTT of each of the at least two wireless network modules.

7. The method of claim 4, further comprising:
determining the first peak transmission rate at the current time point for each of the at least two wireless network modules according to the data increment rate of each of the at least two wireless network modules, the second peak transmission rate of each of the at least two wireless network modules, the first RTT of each of the at least two wireless network modules, and a first rule; and
wherein the first rule is:
determining, based on that the first RTT of each of the at least two wireless network modules is shorter than a predetermined RTT, a larger one in the data increment rate of each of the at least two wireless network modules and the second peak transmission rate of each of the at least two wireless network modules as the first peak transmission rate of each of the at least two wireless network modules; and
determining, based on that the first RTT of each of the at least two wireless network modules is longer than or equal to the predetermined RTT, n times a larger one in the data increment rate of each of the at least two wireless network modules and the second peak transmission rate of each of the at least two wireless network modules as the first peak transmission rate of each of the at least two wireless network modules, n being a positive number less than 1.

8. The method of claim 1, further comprising:
determining the data-stream allocation weight for each of the at least two wireless network modules according to the first peak transmission rate of each of the at least two wireless network modules and a second rule; and
wherein the second rule is:
that the data-stream allocation weight for each of the at least two wireless network modules is equal to the first peak transmission rate of each of the at least two wireless network modules divided by a sum of the first peak transmission rates of the at least two wireless network modules.

9. The method of claim 1, further comprising:
performing the data-stream allocation for the at least two wireless network modules according to a number of data streams established at the current time point by the electronic device and the data-stream allocation weight for each of the at least two wireless network modules.

10. The method of claim 1, further comprising:
performing another data-stream allocation based on that a target application is switched to be a foreground application of the electronic device.

11. An electronic device, comprising:
a processor; and
a memory, configured to store one or more programs;
the one or more programs, when executed, being operable with the processor to:
obtain a first peak transmission rate at a current time point for each of at least two wireless network modules, the at least two wireless network modules being in link aggregation status;
determine a data-stream allocation weight for each of the at least two wireless network modules according to the first peak transmission rate of each of the at least two wireless network modules;
perform data-stream allocation for the at least two wireless network modules according to the data-stream allocation weight for each of the at least two wireless network modules;

obtain a second peak transmission rate at the current time point for each of the at least two wireless network modules; and perform another data-stream allocation based on that a difference between the second peak transmission rate of one of the at least two wireless network modules and the first peak transmission rate of the one of the at least two wireless network modules is higher than or equal to a predetermined value.

12. The electronic device of claim 11, wherein the one or more programs are further operable with the processor to:

determine a data increment rate at the current time point for each of the at least two wireless network modules;

obtain a second peak transmission rate determined last time for each of the at least two wireless network modules;

determine a first RTT at the current time point for each of the at least two wireless network modules; and determine the first peak transmission rate of each of the at least two wireless network modules according to the data increment rate of each of the at least two wireless network modules, the second peak transmission rate of each of the at least two wireless network modules, and the first RTT of each of the at least two wireless network modules.

13. The electronic device of claim 12, wherein the one or more programs operable with the processor to determine the data increment rate at the current time point for each of the at least two wireless network modules are operable with the processor to:

obtain a first data amount at a first time point for each of the at least two wireless network modules, the first time point being the current time point;

obtain a second data amount at a second time point for each of the at least two wireless network modules, the second time point being earlier than the first time point; and determine the data increment rate at the current time point for each of the at least two wireless network modules according to the first data amount of each of the at least two wireless network modules and the second data amount of each of the at least two wireless network modules.

14. The electronic device of claim 12, wherein the one or more programs operable with the processor to determine the first RTT at the current time point for each of the at least two wireless network modules are operable with the processor to:

determine a second RTT for running a TCP;

obtain a third RTT determined last time for each of the at least two wireless network modules that was; and determine the first RTT at the current time point for each of the at least two wireless network modules according to the second RTT and the third RTT of each of the at least two wireless network modules.

15. The electronic device of claim 12, wherein the one or more programs are operable with the processor to:

determine the first peak transmission rate at the current time point for each of the at least two wireless network modules according to the data increment rate of each of the at least two wireless network modules, the second peak transmission rate of each of the at least two wireless network modules, the first RTT of each of the at least two wireless network modules, and a first rule; and wherein the first rule is:

determining, based on that the first RTT of each of the at least two wireless network modules is shorter than a predetermined RTT, a larger one in the data increment rate of each of the at least two wireless network modules and the second peak transmission rate of each of the at least two wireless network modules as the first peak transmission rate of each of the at least two wireless network modules; and determining, based on that the first RTT of each of the at least two wireless network modules is longer than or equal to the predetermined RTT, n times a larger one in the data increment rate of each of the at least two wireless network modules and the second peak transmission rate of each of the at least two wireless network modules as the first peak transmission rate of each of the at least two wireless network modules, n being a positive number less than 1.

16. The electronic device of claim 12, wherein the one or more programs are operable with the processor to:

determine the data-stream allocation weight for each of the at least two wireless network modules according to the first peak transmission rate of each of the at least two wireless network modules and a second rule; and wherein the second rule is:

that the data-stream allocation weight for each of the at least two wireless network modules is equal to the first peak transmission rate of each of the at least two wireless network modules divided by a sum of the first peak transmission rates of the at least two wireless network modules.

17. A non-transitory computer readable storage medium, being configured to store computer programs; and the computer programs, when executed, being operable with a computer to:

determine a data increment rate at a current time point for each of at least two wireless network modules of an electronic device, the at least two wireless network modules being in link aggregation status;

obtain a second peak transmission rate determined last time for each of the at least two wireless network modules;

determine a first round-trip time (RTT) at the current time point for each of the at least two wireless network modules;

determine a first peak transmission rate at the current time point for each of the at least two wireless network modules according to the data increment rate of each of the at least two wireless network modules, the second peak transmission rate of each of the at least two wireless network modules, and the first RTT of each of the at least two wireless network modules;

determine a data-stream allocation weight for each of the at least two wireless network modules according to the first peak transmission rate of each of the at least two wireless network modules; and perform data-stream allocation for the at least two wireless network modules according to the data-stream allocation weight for each of the at least two wireless network modules and a number of data streams established at the current time point by the electronic device.

18. The non-transitory computer readable storage medium of claim 17, wherein the data stream is a set of data packets having a same data type.

* * * * *